United States Patent [19]
Hedlund

[11] 4,396,956
[45] Aug. 2, 1983

[54] OVERCOMING DRUM STALL IN RECORD AND/OR REPLAY SYSTEMS

[75] Inventor: Lee V. Hedlund, Maple Shade, N.J.

[73] Assignee: RCA Corporation, New York, N.Y.

[21] Appl. No.: 210,252

[22] Filed: Nov. 25, 1980

[30] Foreign Application Priority Data

Apr. 10, 1980 [GB] United Kingdom ................ 8011871

[51] Int. Cl.³ ...................... G11B 15/18; G11B 15/48
[52] U.S. Cl. .................................... 360/71; 360/74.3; 360/85
[58] Field of Search ...................... 360/71, 72.3, 74.1, 360/74.2, 74.3, 95, 84–85; 340/675; 318/286, 434, 463, 476, 755, 431

[56] References Cited

U.S. PATENT DOCUMENTS

3,936,877  2/1976  Maruyama et al. .................... 360/71
4,011,588  3/1977  Yasuda et al. ......................... 360/71

Primary Examiner—Alfred H. Eddleman
Attorney, Agent, or Firm—E. M. Whitacre; W. H. Meise

[57] ABSTRACT

In a record and/or replay system of the type wherein magnetic tape moves in a loop about a drum which is rotated by a motor to scan transducer gaps across the tape, drum stall conditions are overcome by momentarily reversing the intended rotational direction of the motor when a command is given to rotate the drum in the intended rotational direction but such rotation does not occur because of tape sticktion on the drum.

9 Claims, 2 Drawing Figures

OVERCOMING DRUM STALL IN RECORD AND/OR REPLAY SYSTEMS

BACKGROUND OF THE INVENTION

In record and/or replay systems of the type wherein magnetic tape moves in a loop about a drum or headwheel which is rotated by a motor to scan transducer gaps across the tape, the drum will sometimes stall due to the tendency of the tape to stick thereon. Such stall conditions frequently occur just after a tape has been threaded in the record and/or replay system and the first command is given for the drum to rotate in a desired direction. Because tape sticking or friction (sticktion) on the drum tends to increase with increased humidity and as the wrap angle of the tape loop about the drum is increased, the stall problem encountered in each record and/or replay system is different and changes from day to day. However, systems having large wrap angle tape loops about the drum encounter the greatest stall problem, such as systems which utilize the SMPTE type C tape format for which the wrap angle of the tape loop about the drum is 346°.

SUMMARY OF THE INVENTION

Upon sensing a headwheel stall condition after a command is given to rotate the drum, the polarity of power to the drum drive motor is momentarily reversed to apply torque for turning the drum in the rotational direction opposite to the intended rotational direction. After this momentary reversal, the polarity of power to the drum drive motor is returned to its initial condition to rotate the drum in the intended direction. In a particular embodiment, the drum drive motor is momentarily reversed periodically until the stall condition ceases to exist.

DESCRIPTION OF THE PREFERRED EMBODIMENTS

Figure 1:
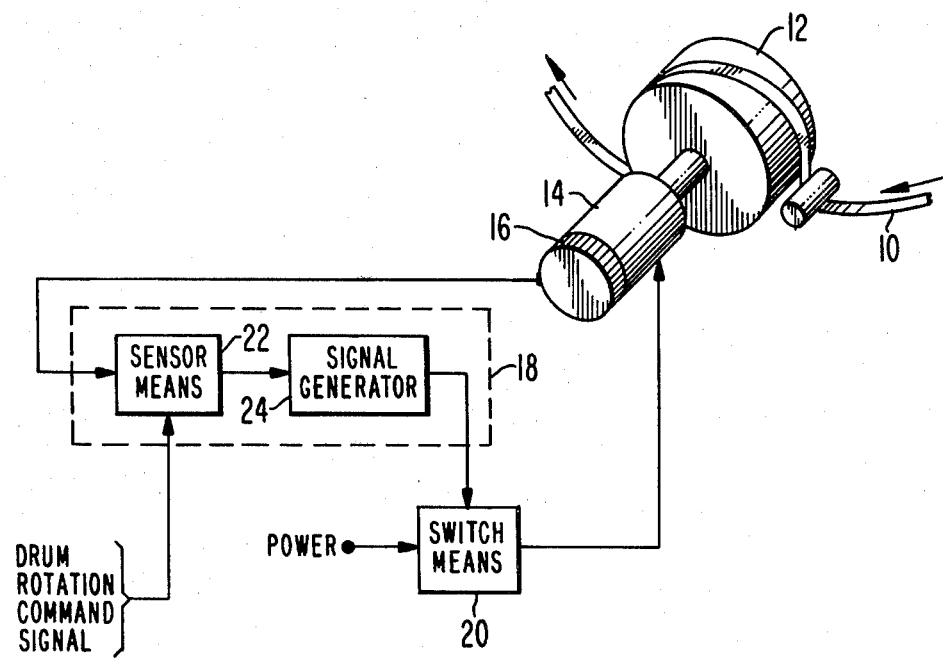
FIG. 1 is a block diagram of apparatus for accomplishing the invention and one preferred embodiment is also illustrated therein for a particular record and/or replay system.

Apparatus for overcoming drum stall in accordance with this invention is shown incorporated into a record and/or replay system in FIG. 1. Although the record and/or replay system is not shown in its entirety, it includes a transport arrangement for moving a magnetic tape 10 in a loop about a headwheel or drum 12 which is rotated by a motor 14 to scan transducer gaps (not shown) across the tape 10. Drum stall is overcome in FIG. 1 with a control means for momentarily reversing the intended rotational direction of the motor when a run command is given to rotate the drum 12 in the intended rotational direction but such rotation does not occur because tape sticktion on the drum 12 creates a stall condition.

A tachometer 16 relating to rotary movement of the drum 12 is also driven by the motor 14 in one preferred embodiment of the invention. A fixed number of pulses is generated by the tachometer 16 during each revolution of the drum 12. Pulses from the tachometer 16 are applied to a detector means 18 for sensing a drum stall condition when a drum rotation command signal is applied thereto. A signal from the detector means 18 is applied to a switch means 20 for momentarily reversing the polarity of power to the motor 14 when a stall condition exists.

In a more particular embodiment, the detector means 18 includes sensor means 22 for determining if the tachometer 16 has been activted by rotation of the motor 14. With this embodiment, a signal from the sensor means 22 is applied to a reverse drive signal generator 24 for controlling the switch means 20. If the tachometer 16 is not activated after the roational command is given, the reverse drive signal generator 24 becomes operational to change the polarity of power to the motor 12 through the switch means 20. The operation of the reverse drive signal generator 24 may be such that it produces a pulse of timed length or a pulse whose length is terminated when the sensor means 22 ceases to produce an output signal. In either case, the output of the reverse drive signal generator 24 is applied to the switch means 20 and causes a momentary change in the polarity of power to the motor 12 which results in reversal of the torque tending to cause rotation of the drum 12. When the drum stall has been overcome or the timed period is over, the polarity of power to the motor 14 is returned to its initial status to rotate the drum 12 in the intended direction.

Figure 2:
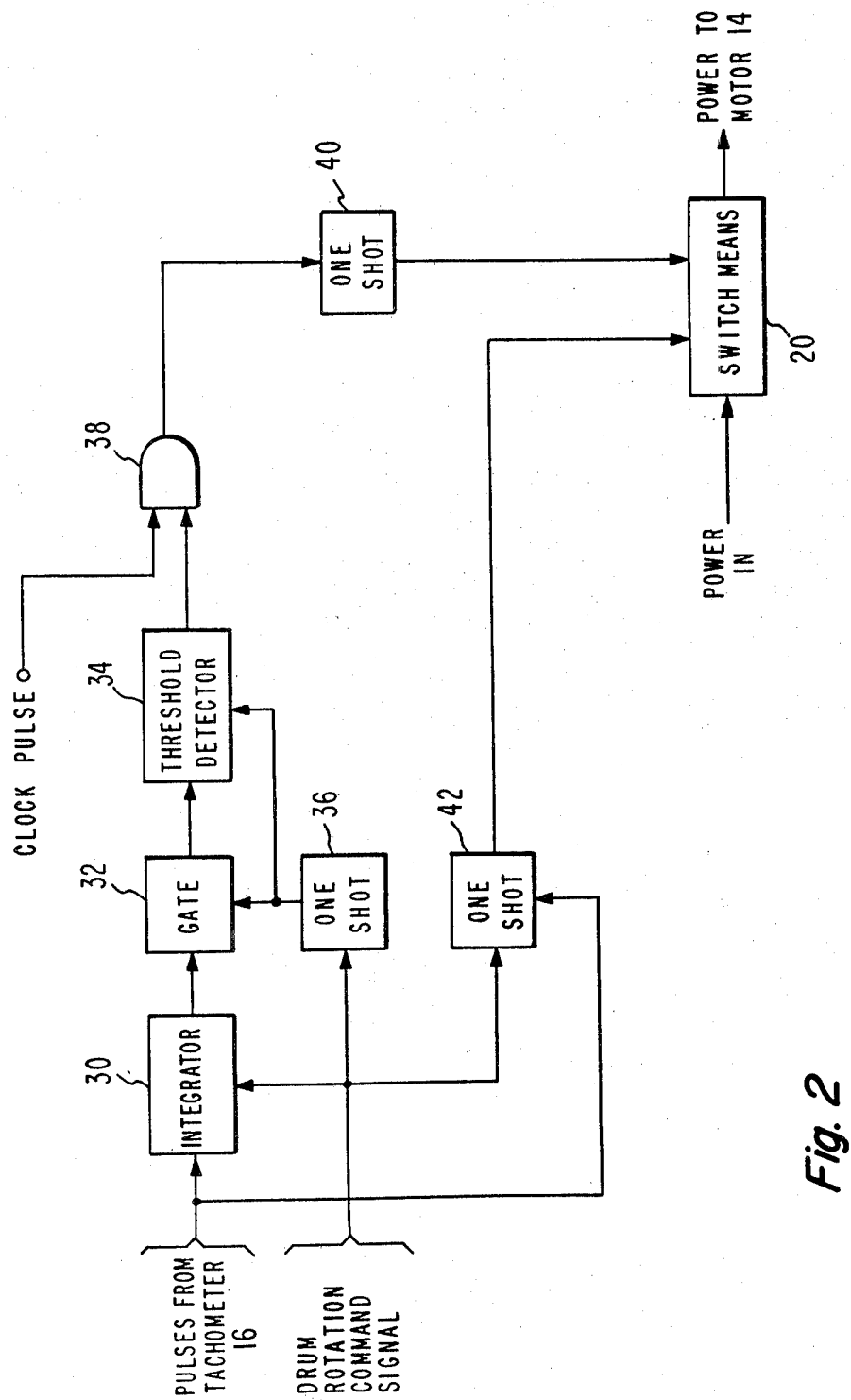
FIG. 2 is another preferred embodiment of the invention wherein repeated polarity reversal and motor burnout protection features are included.

It is possible to repeatedly reverse the polarity of power to the motor 14 through the switch means 20 if the drum stall condition is not alleviated on the first try. Furthermore, the total duration of motor operation under stall conditions can be limited to protect the motor from burnout. FIG. 2 illustrates a particular control means embodiment of the invention, with the repeated polarity reversal and motor burnout protection features incorporated therein. Pulses from the tachometer 16 are applied to an integrator 30, such as a counter (not shown). Output from the integrator 30 is applied through a gate 32 to a threshold detector 34. The gate 32 and threshold detector 34 are enabled through a one-shot multivibrator 36 by the rotation command signal which is also applied to enable integrator 30 for setting its initial conditions. Output from the threshold detector 34 is normally held low until the enabling signal allows it to function. The output is applied to one input of a AND gate 38 which has a suitable clock pulse applied to the other input thereof. The clock pulse could readily be derived from the external sync pulse that is conventionally available in studio recording systems. Output from the AND gate 38 is applied through anoher one-shot multivibrator 40 to control the switch means 20 which is separately enabled through a retriggerable one-shot multivibrator 42 by rotation command signal. Pulses from the tachometer 16 are applied to retrigger the one-shot multivibrator 42.

When the drum rotation command is applied, integrator 30 is initialized and gate 32 and threshold detector 34 are enabled after a delay equal to the pulse duration of one-shot multivibrator 36. If the tachometer has been rotated sufficiently to indicate that stall conditions do not exist when gate 32 is enabled, threshold detector 34 continues to apply a low level output to AND gate 38. Then a low level output is applied from AND gate 38 to one-shot 40 which is not enabled thereby. Therefore, one-shot 40 applies no control signal to the switch which continues to direct power of the polarity required to drive the motor 14 in the direction called for by the rotation command signal. If the tachometer 16 has not been rotated sufficiently to indicate the existence of stall conditions when gate 32 is enabled, threshold detector 34 applies a high level output to AND gate 38. When the next high level clock pulse occurs, AND gate 38 is enabled to apply a high level output to one-shot 40 which is enabled thereby. Therefore, one-shot 40 applies a control signal to the switch 20 which reverses the polarity of power to the motor 14 for the pulse duration of one-shot 40. The duration of the clock pulse is slightly longer than the pulse duration of one-shot 40 which is limited so that the polarity reversal of power to the motor 14 is only momentary. If the tachometer 16 is not rotated sufficiently to indicate that stall conditions have been remedied during the pulse duration of one-shot 40, AND gate 38 will again apply a high level output to one-shot 40 when the next clock pulse occurs. Then a high level output is again applied from AND gate 38 to one-shot 40 which applies another control signal to the switch 20. Consequently, the polarity of power to the motor 14 is again reversed through switch 20 for the pulse duration of one-shot 40. Once the rotation command signal is given, switch means 20 is enabled by the output from retriggerable one-shot 42 which has its pulse duration set to provide burnout protection for the motor 14. This pulse duration of retriggerable one-shot 42 is relatively long when compared to the period of the frequency at which the tachometer pulses occur when no stall conditions exist. Consequently, switch means 20 is continuously enabled after the drum rotation command is applied if no stall condition exists or if an existing stall condition is remedied by reversing the polarity of power to the motor 14 through the switch means 20. However, the enabling pulse from retriggerable one-shot 42 will terminate to disable switch means 20 if an existing stall condition is not remedied within the pulse duration of retriggerable one-shot 42 by repeatedly applying the control signal from one-shot 40 to switch means 20.

What I claim is:

1. In a helical-scan record and/or replay system of the type wherein magnetic tape moves in a loop about a headwheel which is rotated by a motor to scan transducer gaps across the tape, the improvement comprising:

control means coupled to said motor for momentarily reversing the intended rotational direction of the motor when a command signal is given to rotate the headwheel in the intended rotational direction but such rotation does not occur because tape adherence to the headwheel creates a stall condition.

2. The record and/or replay system of claim 1 further comprising a tachometer coupled to and driven by the motor, while said control means includes detector means for sensing a drum stall condition from the output of said tachometer after the headwheel rotation command is given, and further comprising a switch means for reversing the polarity of power to the motor when said detector means senses a headwheel stall condition.

3. The record and/or replay system of claim 2 wherein said detector means includes sensor means for determining if said tachometer is activated by rotation of the motor and a reverse drive signal generator for controlling said switch means in accordance with the output signal from said sensor means.

4. The record and/or replay system of claim 3 wherein said sensor means includes an integrator, a gate, a one-shot multivibrator and a threshold detector; the output of said tachometer being applied to said integrator from which output is applied to said threshold detector through said gate, the command signal being applied to initialize said integrator and enable said one-shot from which output is applied to enable said gate and said threshold detector, said threshold detector receiving the output from said integrator when the pulse duration of said one-shot is terminated after the command signal and the output level from said threshold detector then indicating whether the tachometer has been activated by rotation of the motor.

5. The record and/or replay system of claim 3 wherein said reverse drive signal generator is a one-shot multivibrator which applies its pulse to control said switch means in momentarily reversing the polarity of power to the motor.

6. The record and/or replay system of claim 3 wherein output from said sensor means is applied to one input of an AND gate from which output is applied to said reverse drive signal generator, said AND gate having clock pulses applied to the other input thereof and repeatedly enabling said reverse drive signal generator when a motion stall condition is not remedied by previous direction reversals of the motor.

7. The record and/or replay system of claim 1 wherein said control means includes means includes means for repeating the direction reversal of the motor when the stall condition is not remedied by previous direction reversals of the motor.

8. The record and/or replay system of claim 1 wherein said control means includes protection means for preventing the motor from burning out during stall conditions.

9. The record and/or replay system of claim 8 wherein said protection means includes a retriggerable one-shot multivibrator having the command signal applied to its enabling input, the output of said tachometer applied to its retriggering input and its output applied to enable switch means for reversing the polarity of power to the motor when a drum stall condition is sensed.

* * * * *